US010628648B2

(12) United States Patent
Negro et al.

(10) Patent No.: US 10,628,648 B2
(45) Date of Patent: Apr. 21, 2020

(54) SYSTEMS AND METHODS FOR TRACKING OPTICAL CODES

(71) Applicant: Cognex Corporation, Natick, MA (US)

(72) Inventors: James A. Negro, Arlington, MA (US); Ivan Bachelder, Hillsborough, NC (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 15/803,196

(22) Filed: Nov. 3, 2017

(65) Prior Publication Data

US 2018/0157882 A1 Jun. 7, 2018

Related U.S. Application Data

(63) Continuation of application No. 14/510,689, filed on Oct. 9, 2014, now Pat. No. 9,836,635.

(51) Int. Cl.
*G06K 7/10* (2006.01)
*G06K 7/14* (2006.01)
(Continued)

(52) U.S. Cl.
CPC ......... *G06K 7/1443* (2013.01); *G06K 7/1413* (2013.01); *G06K 7/1417* (2013.01);
(Continued)

(58) Field of Classification Search
CPC .......... G06K 7/10722; G06K 7/10861; G06K 7/10762; G06K 7/1443; G06K 7/10831; G06K 7/14; G07G 1/0045
See application file for complete search history.

(56) References Cited

U.S. PATENT DOCUMENTS

| 4,948,955 A | 8/1990 | Lee et al. |
|---|---|---|
| 5,252,814 A | 10/1993 | Tooley |

(Continued)

FOREIGN PATENT DOCUMENTS

| CN | 1889092 A | 1/2007 |
|---|---|---|
| CN | 101882212 A | 1/2010 |

(Continued)

OTHER PUBLICATIONS

Gutman et al., Tracking Targets Using Adaptive Kalman Filtering. IEEE Transactions on Aerospace and Electronic Systems. Sep. 1990;26(5):691-9.

(Continued)

*Primary Examiner* — Christopher Stanford
(74) *Attorney, Agent, or Firm* — Wolf, Greenfield & Sacks, P.C.

(57) ABSTRACT

Computerized methods and systems for locating barcodes applied to objects are provided. A method can receive a first image of a first barcode fragment applied to a first object captured at a first time and identify a first position of the first barcode fragment. The method can also receive a second image of a second barcode fragment captured at a second time and identify a second position of the second barcode fragment. The method can also predict a range of possible positions of the first barcode fragment at the second time based on a tracking model that tracks the first barcode fragment based on the first position, and determine that the first barcode fragment and the second barcode fragment correspond to the same barcode, if the second position is within the range of possible positions of the first barcode fragment at the second time.

24 Claims, 3 Drawing Sheets

(51) Int. Cl.
*G06T 7/246* (2017.01)
*G06T 7/277* (2017.01)
*G06T 7/194* (2017.01)

(52) U.S. Cl.
CPC ....... G06K 7/1465 (2013.01); *G06K 7/10722* (2013.01); *G06K 7/10861* (2013.01); *G06T 7/194* (2017.01); *G06T 7/246* (2017.01); *G06T 7/277* (2017.01); *G06T 2207/10016* (2013.01); *G06T 2207/30241* (2013.01)

(56) References Cited

U.S. PATENT DOCUMENTS

| | | | |
|---|---|---|---|
| 5,477,042 | A | 12/1995 | Wang |
| 5,754,670 | A | 5/1998 | Shin et al. |
| 6,315,201 | B1 | 11/2001 | Reichenbach et al. |
| 6,494,375 | B1 | 12/2002 | Ishibashi et al. |
| 8,582,821 | B1* | 11/2013 | Feldman ................. G06T 7/248 382/107 |
| 8,646,690 | B2 | 2/2014 | Nunnink et al. |
| 9,836,635 | B2 | 12/2017 | Negro et al. |
| 2003/0219146 | A1* | 11/2003 | Jepson .................... G06K 9/32 382/103 |
| 2006/0192013 | A1 | 8/2006 | Odenthal |
| 2006/0249581 | A1 | 11/2006 | Smith |
| 2007/0073439 | A1 | 3/2007 | Habibi et al. |
| 2008/0029604 | A1 | 2/2008 | Blanford |
| 2008/0166045 | A1* | 7/2008 | Xu ..................... G06K 9/00771 382/170 |
| 2008/0240496 | A1* | 10/2008 | Senior .................... G06T 7/251 382/103 |
| 2009/0092282 | A1* | 4/2009 | Avidan ................... G06T 7/251 382/103 |
| 2011/0116684 | A1* | 5/2011 | Coffman ................ G06T 7/277 382/103 |
| 2013/0016879 | A1* | 1/2013 | Baele ................. G06K 9/00201 382/103 |
| 2013/0020392 | A1* | 1/2013 | Olmstead ........... G06K 7/10722 235/440 |
| 2013/0051624 | A1* | 2/2013 | Iwasaki ............. G06K 9/00791 382/103 |
| 2013/0112750 | A1 | 5/2013 | Negro et al. |
| 2013/0148852 | A1* | 6/2013 | Partis .................. G06K 9/6201 382/103 |
| 2013/0208943 | A1* | 8/2013 | Chuang .................. G06T 7/246 382/103 |
| 2013/0313312 | A1 | 11/2013 | Wang et al. |
| 2014/0124581 | A1 | 5/2014 | Bombaugh et al. |
| 2016/0104021 | A1 | 4/2016 | Negro et al. |

FOREIGN PATENT DOCUMENTS

| | | |
|---|---|---|
| CN | 103119605 A | 5/2013 |
| CN | 103150536 A | 6/2013 |

OTHER PUBLICATIONS

Juett et al., Barcode Localization Using a Bottom Hat Filter. NSF Research Experience for Undergraduates. 2005; 8 pages.

Kutiyanawala et al., A Simple and Efficient Approach to Barcode Localization IEEE. 7th International Conference on Information Communcations and Signal Processing. Dec. 2009; pp. 1-5.

Pylyshyn, Visual indexes, preconceptual objects, and situated vision. Cognition. 2001; 80.1:127-58.

Zhang et al., Automatic Real-Time Barcode Localization in Complex Scenes. IEEE International Conference on Image Processing. Atlanta, GA. Oct. 2006; pp. 497-500.

\* cited by examiner

SYSTEMS AND METHODS FOR TRACKING OPTICAL CODES

CROSS-REFERENCE TO RELATED APPLICATIONS

This application is a continuation of U.S. application Ser. No. 14/510,689 filed Oct. 9, 2014, entitled "SYSTEMS AND METHODS FOR TRACKING OPTICAL CODES" which is related to U.S. application Ser. No. 14/511,030 entitled "Barcode Decoding," by Ivan A. Bachelder and Savithri Vaidyanathan, filed on October, 2014, (now granted U.S. Pat. No. 9,361,499, and issued on Jun. 7, 2016), the content of each of which is incorporated herein in their entirety.

FIELD OF THE INVENTION

The present invention relates to tracking objects and more specifically predicting a range of possible future positions of an optical code.

BACKGROUND OF THE INVENTION

Automated identification and tracking of objects has many applications, for example, in products using optical codes. Optical codes are patterns of elements with different light reflectance or emission, assembled in accordance with some predefined rules. A known optical code is the linear barcode used in different consumer products. A linear barcode includes bars or spaces in a linear fashion. Optical codes can also be two-dimensional. Linear and two-dimensional barcodes are generally called symbols. Two dimensional optical codes may include on/off patterns in a two-dimensional matrix code. Barcodes or symbols can be printed on labels placed on product packaging or directly on the products themselves.

The information encoded in a bar code or symbol can be decoded using optical readers in fixed-mount installations or in portable hand held devices. For example, in the case of a fixed-mount installation, a transfer line moves objects marked with codes or symbols in the range of a fixed-mount reader, which can generate images of the codes or symbols. Image-based reader devices typically include at least one camera capable of generating two dimensional images of a field of view (FOV). For example, many systems currently employ a two dimensional charge-coupled device (CCD) image sensor, which acquires images that are then received by a processor. The processor is programmed to examine image data to identify code candidates (e.g., bar code or symbol candidates) and decode those code candidates. Reader devices can be programmed to obtain images of a field-of-view (FOV) in rapid succession and to decode any obtained code candidates as quickly as possible. The processor runs one or more decode algorithms to decode the code candidates.

In fixed-mount installations, the optical reader can obtain a large number of images of the same object and applied code. The object and the applied code can be in different locations along the direction of travel through the FOV. In addition, some objects and applied codes in an image will be new to the FOV, for example, those that were located outside the FOV during previous images, and others will be exiting the FOV prior to the generation of a subsequent image.

When acquiring an image of a code, the quality of the image depends on several factors, for example, the angle of the reader with respect to a surface on which the code is applied, the material and texture of the surface on which the code is applied, the code marking quality or damage after marking, the ambient and device lighting characteristics, the distortion in the applied symbol, the transfer line speed, the distance from the surface on which the code is applied, the optical blur, camera resolution, sensor noise, motion blur (part motion during sensor exposure), etc. Image quality affects the ability of a processor running a specific algorithm to decode a code. For example, in many cases a simple decoding algorithm will not be able to successfully decode codes in an image unless the circumstances surrounding image acquisition are substantially ideal. In addition, the image might not include the entire code, but just fragments of it.

SUMMARY

Multiple images of the code may be necessary to reconstruct the entire code. To compensate for imperfect and incomplete image acquisition of a code, tracking algorithms can help locate where the code would be in subsequent captured images. After different fragments of the same code have been identified in subsequent images, stitching algorithms may be used to stitch the different fragments to generate the entire code.

In some aspects a computerized method for locating barcodes applied to objects is provided. The method includes receiving, by a processor, a first image of a first barcode fragment applied to a first object captured by a camera at a first time and identifying, by the processor, a first position of the first barcode fragment based on the first image. The method further includes receiving, by the processor, a second image of a second barcode fragment captured by the camera at a second time and identifying, by the processor, a second position of the second barcode fragment based on the second image. The method includes predicting, by the processor, a range of possible positions of the first barcode fragment at the second time based on a tracking model that tracks the first barcode fragment based on the first position, and determining, by the processor, that the first barcode fragment and the second barcode fragment correspond to a same barcode applied to a first object if the second position is within the range of possible positions of the first barcode fragment at the second time.

In some aspects a computerized method for locating barcodes applied to objects in a system configured to expand a field of view of a scene imaged by a camera having an image sensor. The method includes receiving a first image captured by the camera at a first time, the first image including a first field of view and a second field of view, wherein the first field of view of the first image depicts a first barcode fragment and the second field of view of the first image depicts a second barcode fragment, identifying, based on the first image, a first position of the first barcode fragment within the first field of view of the first image, and further identifying, based on the first image, a first position of the second barcode fragment within the second field of view of the first image. The method can include receiving a second image captured by the camera at a second time, the second image including a first field of view and a second field of view, wherein the first field of view of the second image depicts a third barcode fragment and the second field of view of the second image depicts a fourth barcode fragment, identifying, based on the second image, a second position of the third barcode fragment within the first field of view of the second image, and identifying, based on the second image, a second position of the fourth barcode fragment within the second field of view of the second image. The method includes predicting a range of possible positions of the first barcode fragment at the second time based on a first tracking model that tracks the first barcode fragment based on the first position of the first barcode fragment, predicting a range of possible positions of the second barcode fragment at the second time based on a second tracking model that tracks the second barcode fragment based on the first position of the second barcode fragment, determining whether the second position of the third barcode fragment is within the range of possible positions of the first barcode fragment at the second time, determining whether the second position of the fourth barcode fragment is within the range of possible positions of the second barcode fragment at the second time, and determining that the first barcode fragment, the second barcode fragment, the third barcode fragment, and the fourth barcode fragment correspond to a same barcode if the second position of the third barcode fragment is within the range of possible positions of the first barcode fragment and the second position of the fourth barcode fragment is within the range of possible positions of the second barcode fragment at the second time.

In some aspects, a system for locating barcodes applied to objects is provided. The system includes a camera configured to capture images of barcodes applied to objects and a processor in communication with the camera. The processor is configured to receive a first image of a first barcode fragment applied to a first object captured by the camera at a first time, identify a first position of the first barcode fragment based on the first image, receive a second image of a second barcode fragment captured by the camera at a second time, identify a second position of the second barcode fragment based on the second image, predict a range of possible positions of the first barcode fragment at the second time based on a tracking model that tracks the first barcode fragment based on the first position, and determine that the first barcode fragment and the second barcode fragment correspond to a same barcode applied to a first object if the second position is within the range of possible positions of the first barcode fragment at the second time.

In some aspects, a system for locating barcodes applied to objects is provided. The system configured to expand a field of view of a scene imaged by a camera having an image sensor. The system includes the camera configured to capture images of barcodes applied to objects and a processor in communication with the camera. The processor is configured to receive a first image captured by the camera at a first time, the first image including a first field of view and a second field of view, wherein the first field of view of the first image depicts a first barcode fragment and the second field of view of the first image depicts a second barcode fragment, identify, based on the first image, a first position of the first barcode fragment within the first field of view of the first image, and identify, based on the first image, a first position of the second barcode fragment within the second field of view of the first image. The processor is configured to receive a second image captured by the camera at a second time, the second image including a first field of view and a second field of view, wherein the first field of view of the second image depicts a third barcode fragment and the second field of view of the second image depicts a fourth barcode fragment, identify, based on the second image, a second position of the third barcode fragment within the first field of view of the second image, and identify, based on the second image, a second position of the fourth barcode fragment within the second field of view of the second image. The processor is configured to predict a range of possible positions of the first barcode fragment at the second time based on a first tracking model that tracks the first barcode fragment based on the first position of the first barcode fragment, and predict a range of possible positions of the second barcode fragment at the second time based on a second tracking model that tracks the second barcode fragment based on the first position of the second barcode fragment. The processor is configured to determine whether the second position of the third barcode fragment is within the range of possible positions of the first barcode fragment at the second time, determine whether the second position of the fourth barcode fragment is within the range of possible positions of the second barcode fragment at the second time, and determine that the first barcode fragment, the second barcode fragment, the third barcode fragment, and the fourth barcode fragment correspond to a same barcode if the second position of the third barcode fragment is within the range of possible positions of the first barcode fragment and the second position of the fourth barcode fragment is within the range of possible positions of the second barcode fragment at the second time.

These and other embodiments will be described in greater detail in the remainder of the specification referring to the drawings.

DETAILED DESCRIPTION

Figure 1:
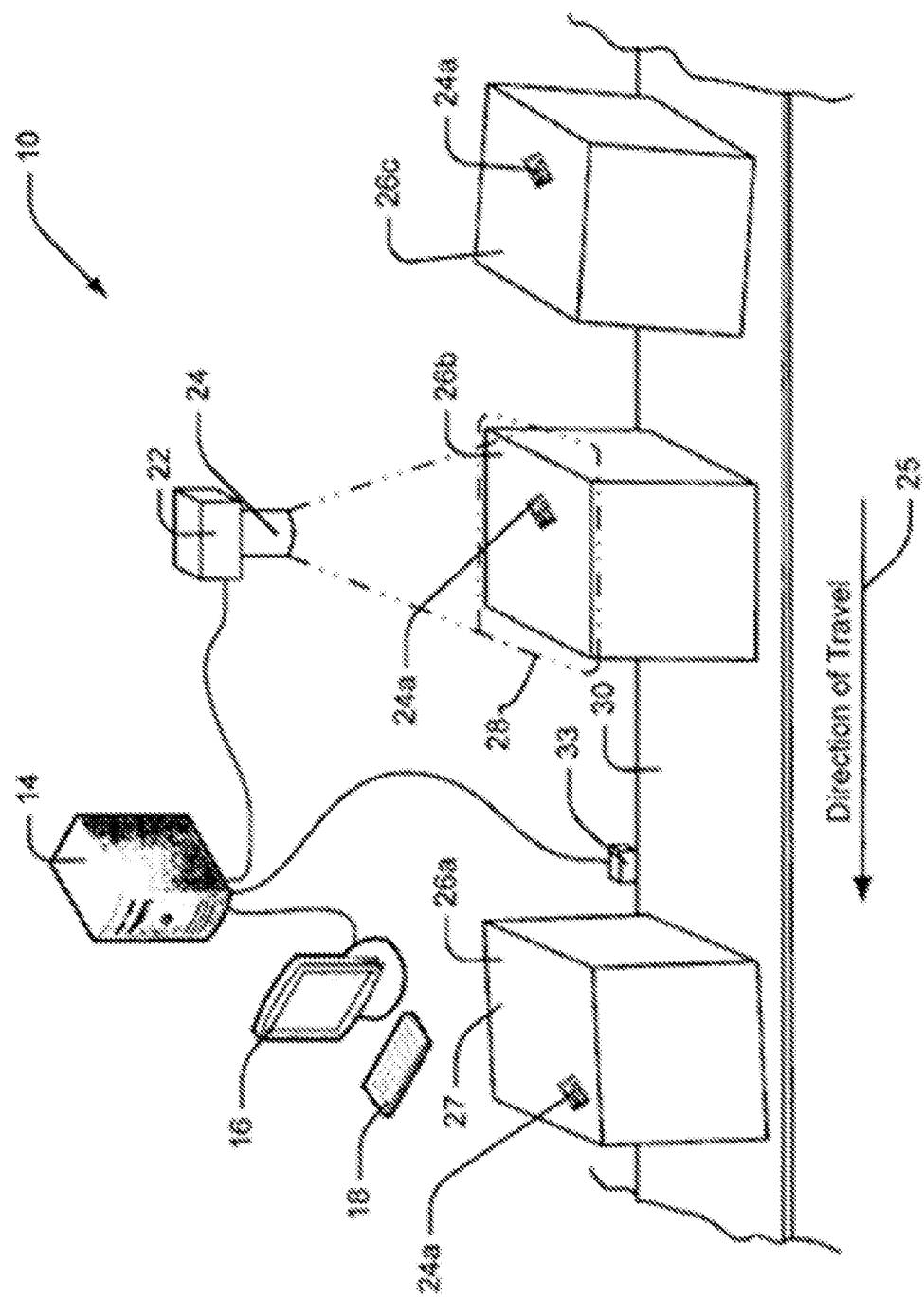
FIG. 1 shows an exemplary image processing system, in accordance with some embodiments.

The various aspects of the subject invention are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

The present invention is directed to systems and methods for tracking codes in optical reader systems. According to aspects of the present disclosure, tracking models predict the possible range, and sometimes, relative likelihoods, of poses of an optical code or group of optical codes, based at least on one or more previous measured poses of the same optical code or group. This predictive capability of the tracking models constrains the range of possible correspondences or matches between a moving optical code and an optical code identified at subsequent times or different spatial frames of reference. More generally, the tracking models can constrain the range of possible correspondences between a group of interest and group of candidate optical codes identified at subsequent times or different spatial frames of reference. According to alternative aspects of the present disclosure, the tracking models can prioritize possible correspondences by likelihood, for the purposes of simultaneously tracking one or more distinct, but possibly similar optical codes or groups of optical codes.

A pose can include the position, orientation, and/or apparent size (scale) of the optical code or group. The range of poses may be indicated by a single predicted pose in conjunction with some uncertainty, for example, a location in addition to an expected error in that location described by a distribution, for example, a normal distribution. The range of poses may alternatively be indicated simply by a set or locus of possible poses, for example, a line segment or circular area representing the possible locations, with an associated probability distribution, for example, a uniform distribution.

Referring to FIG. 1, aspects of the present invention will be described in the context of an exemplary imaging system/transfer line 10 wherein a transfer line 30 moves objects 26a, 26b, 26c, etc., along a direction of travel 25. A person of ordinary skill would understand that the imaging system 10 is an exemplary application of the present invention and that the disclosed systems and methods for tracking optical codes on objects are applicable in other applications.

In the present example, each of the objects has similar physical characteristics and therefore, only one object, for example, object 26b, will be described in detail. Specifically, object 26b includes a surface 27 which faces generally upward as object 26b is moved by transfer line 30. A matrix code 24a is applied to top surface 27 for identification purposes. Similar-type matrix codes 24a are applied to top surfaces of each of objects 26a and 26c.

Referring still to FIG. 1, the image processing system includes a camera 22 including optics 24 that define a field of view 28 below the camera 22 through which transfer line 30 moves the objects 26a, 26b, 26c, etc. Thus, as the objects move along direction of travel 25, each of the top surfaces 27 comes into field of view 28. Field of view 28 can be large enough such that the entire top surface 27 is located at one point or another within the field of view 28 and therefore any code applied to the top surface 27 of an object passes through the field of view 28 and can be captured in an image by camera 22. As the objects move along the direction of travel 25, the camera 22 can capture partial fragments of the code applied to the top surface 27. A person of ordinary skill would understand that the field of view can be large enough that it can capture more than one object. Moreover, the image processing system 10 can include more than one cameras and/or a camera with a field-of-view expander as described in U.S. Pat. No. 8,646,690 entitled "System and Method for Expansion of Field of View in a Vision System," to Nunnink et al., the contents of which are incorporated herein in their entirety. U.S. Pat. No. 8,646,690 provides details of the field-of-view expander, for example, at column 8, line 43 to column 9, line 28 and FIGS. 5-7.

The image processing system 10 also includes a computer or processor 14 (or multiple processors) which receives images from camera 22, examines the images to identify sub-portions of the images that may include an instance of a matrix code as code candidates and then attempts to decode each code candidate in an effort to identify the object currently within the field of view 28. To this end, camera 22 is linked to processor 14. An interface device 16/18 can also be linked to processor 14 to provide visual and audio output to a system user as well as for the user to provide input to control the imaging system, set imaging system operating parameters, trouble shoot imaging system problems, etc. In at least some embodiments, the imaging system also includes a tachometer (encoder) 33 positioned adjacent transfer line 30 which may be used to identify direction of travel 25 and/or the speed at which transfer line 30 transfers objects through the field of view.

Figure 2:
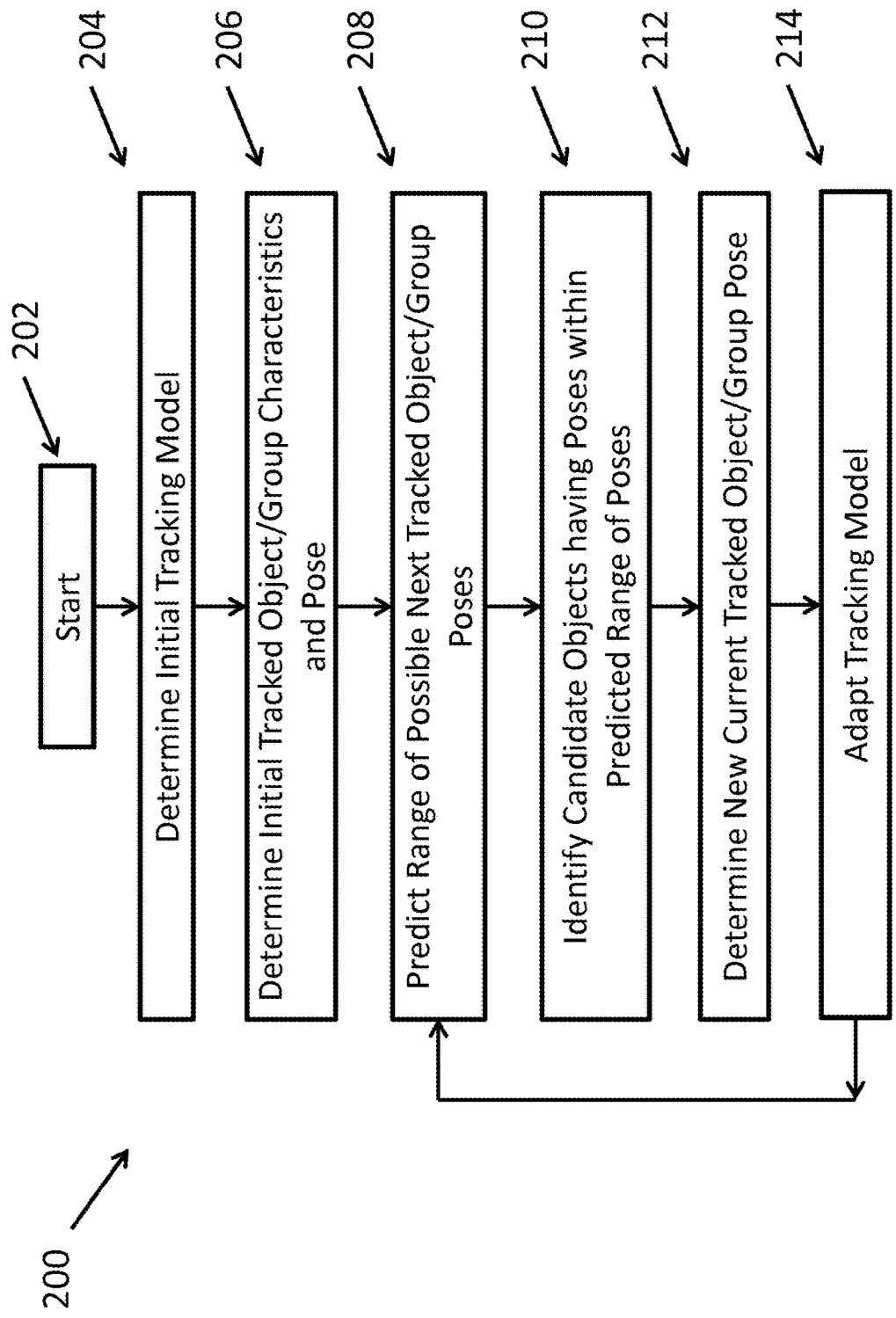
FIG. 2 shows an exemplary adaptive tracking model, in accordance with some embodiments.

FIG. 2 shows an exemplary method 200 for predicting an optical code or group pose based on an adaptive tracking model, according to aspects of the invention. Specifically, the process starts 202 by determining an initial tracking model 204 for predicting the range of next possible poses. The method determines the initial optical code or group of optical code characteristics and pose 206 and predicts a range of possible next tracked optical code (or group) poses 208. Details on how the method predicts the range of possible next optical code poses are provided below. The method then identifies the candidate optical codes having poses within the predicted range 210 and determines a new optical code pose, for example, by matching the characteristics of candidate optical codes to the characteristics of the tracked optical code 212. The method can then optionally adapt the tracking model 214. This method can iteratively repeat to determine subsequent range of poses for a particular optical code or group.

According to aspects of the present invention, the disclosed systems and methods can track a single physical linear (barcode) or 2D identifying code/symbol, or a collective arrangement of such symbols within one or more images or fields-of-view. The disclosed systems and methods can track optical codes based on at least one of a direction of motion (in image coordinates or physical coordinates), an optical code velocity (in image or in physical coordinates), a range of motion or movement (in between images, in pixels, or physical space), an optical code acceleration or deceleration, the smoothness of motion, the rotational velocity, characteristics of the particular system, and/or the like.

According to aspects of the present invention, system parameters can include characteristics of the optical reader system, e.g., the camera system. For example, the camera system can include multiple cameras. Alternatively, the camera system can include a camera with a field-of-view expander, with characteristics that can include exact or approximate boundaries between the fields of view in acquired images, exact or appropriate orientation in acquired images, any calibration with pixel-to-pixel correspondence information. Additional camera system parameters can include relative camera positions and calibration of the camera relative to other cameras, in a multi-camera system, relative camera positions relative to the conveyer belt, e.g., orientation, viewing angle, distance, calibration, which may include the pixel size in connection with the distance between the camera and the conveyor belt, and generally, any relationship between the conveyor plane and the image plane. Camera calibration can include a mapping of sensor imager pixels to physical space. This calibration can include modeling of the lens, field of view expander, and other optical distortion.

Other system characteristics can include information about the conveyor system, which can include, for example, the conveyor belt speed (in image coordinates or physical coordinates), the conveyor belt width and length.

The disclosed tracking systems and methods can track codes associated with objects based on code-related inputs. For example, the tracking model can track optical codes based on information about the code motion as the object moves, for example, on the conveyor belt. Images taken by the camera can include a time stamp which indicates the time at which the images was captured. Image capture typically indicates the time at which the sensor was exposed, but may indicate the time at which the image was transferred to memory, or another consistent event within the image capture sequence. The information can include the position and velocity of the code, derived from the encoder readings, time stamps of images that include the particular code that is being tracked by the tracking model.

Code characteristics that may be used by the tracking model can also include invariant measurements or information related to the identity and appearance of the code irrespective of its pose. This information can include for example, the type of code, which can be defined by symbology or code category, e.g., two-dimensional symbol, multi-width barcode, two-width barcode. Additional information can include dimensional attributes of the code, for example, the aspect ratio, initial length, and width, and any known data string information, including, for example, the string length, range of character values, and character features, or any spatial relations to other codes, if there is more than one code in an arrangement.

According to aspects of the present invention, additional parameters that can be used by the disclosed tracking systems and methods can include information about the particular code pose. This information can include, for example, the position, in any type of coordinates (x,y) in the image, of the center, corner, or some identifiable point on the code. Typically, in the case of a linear barcode, the location in the image isn't accurate in the direction parallel to its bars, and is accurate to within half a character in the direction perpendicular to the bars. For two-dimensional symbols, the location is typically accurate within half a module in x and y. Additional code-related information can include the orientation of the code in the image, any skew or warping of the code, and the scale of the code, e.g. the apparent module size. Apparent module size is the size of the smallest code unit, e.g. bar or two-dimensional module, in units of pixels per module (PPM).

Figure 3:
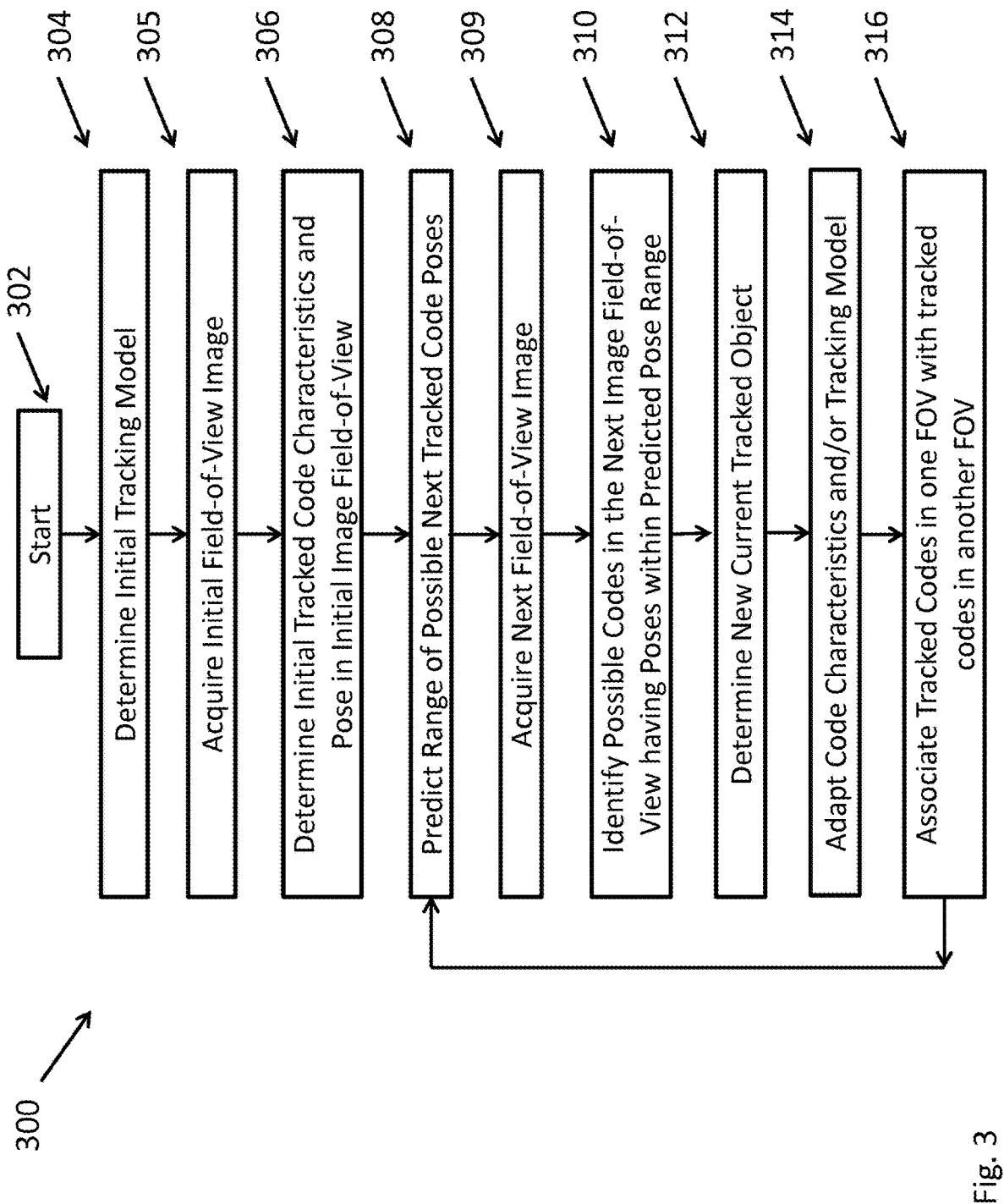
FIG. 3 shows an exemplary adaptive tracking model, in accordance with some embodiments.

FIG. 3 shows an exemplary method 300 for predicting a range of possible code poses based on an adaptive tracking model, according to aspects of the invention. Specifically, the process starts 302 by determining an initial tracking model 304 for predicting the range of next possible poses and acquiring an initial field-of-view image 305. The method then determines the initial tracked code characteristics and pose in the initial FOV image 306, using for example, symbol candidate finding algorithms. Finding algorithms are described in the literature, for example, in U.S. Pat. No. 4,948,955, in "A Novel Method for Barcode Localization in Image Domain," by Bodnár et el., in "Automatic Real-Time Barcode Localization in Complex Scenes," by Zhang et al., "A Simple and Efficient Approach to Barcode Localization," by Kutiyanawala et al., "Barcode Localization Using a Bottom Hat Filter," by Juett et al., and "A simple and efficient approach to barcode localization," by Kutiyanawala et al., the contents of all are incorporated herein in their entirety. At this point, decoding each candidate code is not necessary, only identifying a symbol as a likely code. Moreover, the disclosed methods and systems can track the code, even if only a portion of the code is visible, as long as it can be identified as a viable code.

Then, the disclosed method can predict a range of possible next tracked code poses 308, based, for example, on the current tracked code pose, optional code motion inputs, optional system inputs, and/or the code tracking model. According to aspects of the present disclosure, the range may optionally include relative likelihoods of poses within the predicted range. The method then can acquire the next FOV image 309, and then identify possible codes in the next FOV image having poses within the predicted pose range 310. At this step, the method can filter out false candidates, for example, by looking for candidate with evidence of bars, process the candidates to measure features, for example, edges or evidence for bars, that can be used to match against the tracked code, including type of symbology, module size, length, and attempt to decode the candidates to additionally identify and remove false candidates and provide additional information for matching of code fragments.

After identifying possible codes, the method can then match characteristics of candidate codes to tracked code characteristics to determine a new current pose of the tracked optical code 312. In addition, at this step, the method can disambiguate two or more matching candidate codes using pose likelihoods, and can use pose to disambiguate ways to match the string characters of a tracked barcode with a candidate, e.g., when the character offset is ambiguous due to repeated sub-strings.

The method can then adapt the code characteristics and/or the tracking model 314. For example, the method can adapt the code tracking model based on the error between the predicted pose of the code and the actual pose within the predicted region. The method can adapt the code characteristics, for example, by combining the decoded or partially decoded strings and/or measured features for the code. Finally, the method can optionally associate tracked codes in one field-of-view with tracked codes in another field-of-view, for example, by comparing code characteristics or by using camera or field-of-view calibrations. This method can iteratively repeat to determine subsequent range of poses for a particular code.

Examples of Tracking Models

The following examples of tracking models are provided only for illustrative purposes and are not limiting. For each of the following examples, the physical situation is provided and the parameters of the tracking model are discussed.

According to aspects of the present disclosure, the disclosed systems and methods can track codes applied to boxes moving on a conveyor belt in a system with a single camera providing a single field of view. There are two linear barcodes on each box in a "picket fence" orientation, and the belt is moving vertical (up) relative to camera. A picket fence orientation is one in which the barcode is substantially horizontal (bars vertical).

The tracking model can use the direction of motion, the minimum and maximum movement between images, and the maximum error in vertical movement (in pixels) to predict a range of possible next code poses. The tracking model can further assume the next code pose can be within the predicted range under a uniform distribution. The initial tracking model can be one in which the direction of motion is equal to 90 degrees, the minimum movement is 0 m/sec, and the maximum movement can be half the image height.

A simple prediction based on an exemplary model can identify the next location of each barcode. For example, the model can predict that the "y" location can be along a vertical line segment starting and ending at the minimum and maximum movement distances from each barcode's current location, respectively and the "x" location to be not more than the maximum error from the vertical line. A possible correction in the model can include replacing the direction of motion in the model with the actual measured angle between the last two positions, or possibly the running average of angles.

According to some aspects of the present disclosure, the disclosed systems and methods can track codes applied to boxes moving randomly on a conveyor belt, where, at a single time, up to two boxes can be visible. Assuming the system includes a single camera with a field-of-view expander and no calibration information, for example, as described in U.S. Pat. No. 8,646,690, the conveyor has a positional encoder, and the conveyor belt has a constant velocity and does not stop moving boxes. In addition, in this example, each code has an unknown orientation, which does not change as the boxes move on the conveyor belt.

The disclosed systems and methods can use information about the encoder (conveyor position), the relative orientation and regions of fields-of-view in the captured images, a range of possible box heights, and camera calibration information, for example, in physical units per pixel at the conveyer and at the highest box height.

The tracking model can use the direction of motion, the velocity of the boxes in the image, information about a maximum deviation from expected location to predict a range of possible next code poses of each tracked code in each field of view. The tracking model can also assume a Gaussian likelihood as a function of distance from expected location to predict a range of possible next code poses.

The initial tracking model can comprise a direction of motion equal to 90 degrees, a maximum deviation equal to 20 pixels, and a velocity in the image equal to the average of velocities of the conveyor and maximum box height, each determined by using the appropriate camera calibration to compute the motion corresponding to one encoder unit.

A simple prediction based on an exemplary model can identify the next location of each code. For example, the model can predict the next location of code by multiplying the velocity times the difference between the current and previous encoder reading, having an orientation similar to the orientation in the code characteristics. The likelihood of the code being within the predicted range can be determined by a Gaussian likelihood function with respect to the predicted location. Possible corrections to the model can include correcting the orientation of the symbol in the code characteristics by taking a running average of measured orientations and correcting the velocity using a running average of the measured distance between the previous and current locations, divided by the encoder change.

According to some aspects of the present disclosure, the disclosed systems and methods can track codes applied to boxes read by a handheld reader or presentation reader, e.g. reader at a grocery store checkout. In this example, each box has a single barcode, with confusing text, and there are arbitrary but smooth positional changes of code with respect to the camera and unknown but smoothly varying code orientation and velocity.

The tracking model can use separate and independent Kalman filters for x and y velocities, and for angular velocity. Kalman filtering is well known in the art as a method for target tracking. An example of using Kalman filtering for tracking can be found in "Tracking Targets Using Adaptive Kalman Filtering," by Gutman, P., Velger, M., IEEE Transactions on Aerospace and Electronic Systems Vol. 26, No. 5: pp. 691-699 (1990). The initial tracking model can set the velocity in the x and y dimensions both equal to zero, the angular velocity also equal to zero, the variance measurements for velocity to a large value, and the variance measurements for position to something that is on the order of the positional measurement error (e.g. a half a character width).

A simple prediction based on an exemplary model can employ a constant velocity or acceleration models to predict the next position of the code. Possible tracking model corrections can include simply updating the Kalman filter variances in the standard manner.

According to some aspects of the present disclosure, the disclosed systems and methods can labels applied to boxes moving randomly on the conveyor belt. Each label has a cluster of printed barcodes and two-dimensional symbols, where some barcodes and symbols are stacked, e.g., printed parallel to others. The labels can be on top or side of box, and some labels are on top of other labels. The conveyor belt has a constant velocity, but can stop periodically. The cameras set up with an oblique viewing angle. The optical system has two cameras, each with a field-of-view expander, and there is no calibration information. Each label is at an unknown independent orientation, that can change smoothly as the box catches on the sides of the conveyor.

The disclosed systems and methods can use a relative orientation and regions of fields-of-view in the image and the time stamp of each image to predict a possible range of poses for a label. The tracking model can further use as a parameter the direction of motion of the label in the captured image, the velocity of the label in the captured image, the angular velocity of the label, the maximum deviation from an expected location, and the maximum angular deviation. The tracking model can further assume a Gaussian likelihood as a function of distance from expected location and angular deviation.

The initial tracking model can consist of a direction of motion equal to 90 degrees, with a 15-degree uncertainty, unknown values for the velocity and angular velocity in the captured image, and a maximum deviation of 20 pixels. The model can also assume a spatial arrangement of the codes on the label, as measured in the first image, in each field of view.

A simple prediction based on an exemplary model can identify the next location of the label center under different assumptions. If velocity is unknown, then the label can be anywhere along the line segment between the previous label center and the edge of the field-of-view along the direction of motion. Alternatively, if the velocity known, the label center can be at a point on the line segment that is a distance away determined by multiplying the velocity by the difference in the time stamps between the current and previous images. The model can also predict the orientation of the next label. Specifically, if the angular velocity is unknown, then the next label can have any orientation. If the angular velocity is known, the label will be at an angle that is determined by multiplying the angular velocity by the difference in the time stamps between the current and previous images, and adding to the previous angle.

The likelihood of the label being within the predicted range of poses can be determined by the Gaussian likelihood function with respect to the predicted location and angle. The predicted positions of each of the codes on the label can be determined using the spatial arrangement. Possible corrections that might be applied to the model can include determining the pose of the label by fitting the found spatial arrangement of codes (or at least the ones that are visible) to the original spatial arrangement, correcting the orientation of a label in the code characteristics by taking a running average of measured orientations, correcting the angular and linear velocity using a running average of the measured distance between the previous and current locations, divided by the time stamp change, and correcting the spatial arrangement by averaging the measured relative position and orientation of each code in the arrangement.

In image-based automatic identification systems, the image-based readers may, sometimes, fail to read an optical code based on the captured images. For example, some captured images may not contain an optical code. The cameras in modern image-based optical code readers typically operate at a high frequency. Because of the high rate of capturing images, some images may not contain an optical code (e.g., an image may be of a conveyor belt or a box as it is coming into the field of view, or a barcode coming into the field of view). Naturally, in those cases, analyzing the captured image will not identify an optical code within the image. In other cases, a captured image may contain an optical code that may or may not be located by the image-based system. Moreover, even in the cases where an optical code has been located by the image-based system, the image-based system might fail to decode the optical code.

According to aspects of the present disclosure, the disclosed systems and methods can identify images with an optical code in the image and can store those images. This can be done to improve image buffering. The optical code in the images can either be decoded or not. In addition, the disclosed systems and methods can identify secondary images, for example, images where no optical code has been located within the images. The disclosed systems and methods can collect the saved images and determine the reasons for an unsuccessful optical code read.

Typical optical reader systems store and transfer all captured images to a processing unit for further processing, for example, for analyzing the reasons why a particular optical code did not decode. However, those systems have limited bandwidth and limited storage space for images. Therefore, it is impractical to transfer all images offline to the processing unit or to store all captured images in the optical reader system memory. In addition, not all captured images may be useful to the processing unit to identify the reasons for the decode failure, therefore, important optical reader resources can end up being wasted when transferring or storing those images. The disclosed systems and methods can identify only a subset of the captured images, for example, to analyze why a particular code failed to decode.

According to some aspects of the disclosure, an optical reader can have within its range of vision an object with an optical code applied on the object. Specifically, the optical reader can capture multiple images or frames of the object. From the entire set of captured images, the disclosed systems can first identify the images that have an optical code and separate them from other images that do not have an optical code.

The disclosed methods can attempt to decode the images that contain an optical code. The disclosed methods can successfully decode some of the images that contain a code. Other images that contain a code but were not successfully decoded, can be used to analyze the reasons for the decode failure. According to some aspects of the disclosure, the images with a code that did not successfully decode can be split into two groups. The first group can contain images-of-greatest interest and the second group can contain redundant images. The images in the first group and the second group can be stored in different memory locations. The images of greatest interest can be stored, for example, in internal memory or be transmitted to a remote location, for example, over the internet or local area network. The memory location where the second group of redundant images is stored can be reused to store other images.

In typical applications, the optical reader is configured to identify a single image of greatest interest for each code that was identified but was not successfully decoded. However, a single image may not be able to provide adequate information about the reasons a particular code did not decode. For example, one image can contain a fragment of the code, while a second one can contain a different fragment of the code. Moreover, in addition to the actual code, there can be other information, for example, an address block, that may not be captured by a single image, and can also be useful to the processing system. According to some aspects of the disclosure, the system identifies a plurality of images of greatest interest, which can be separated from the redundant images based on different criteria, that can include, for example, the distance of barcode fragment from the center of the field of view, a fraction of symbol visible in the image, the barcode quality, a fraction of decodable characters, the confidence of decodable characters, an image quality in region of barcode, etc. According to aspects of the disclosure, the tracking model as discussed above can be used to identify images of greatest interest. For example, the tracking model can be used to identify which images correspond to the same code that did not decode.

The images can have the entire optical code or even a fragment of the optical code. The set of interesting image frames can contain one image frame for each unsuccessfully decoded symbol. Moreover, the images are matched to identify duplicate images that have the optical code.

The disclosed systems can include more than one optical reader. All optical readers can be configured to have the objects within their range of vision. The system can synchronize the images captured from the different optical readers that correspond to the same object. If there is more than one optical reader in the system, the optical readers can operate in a master/slave array. This can help with image synchronization, for example, sharing compatible illumination, or avoiding incompatible illumination. In addition, the system in a master/slave array can provide consolidated data results, for example, as in a multi-reader scan tunnel.

The disclosed readers can match the decode results and the image candidates the failed to decode the optical codes. Among the images that the system has successfully decoded, the disclosed systems and methods can analyze the images to determine the best image to record and save. In addition, the disclosed systems determines the best image among the images that did not successfully decode.

According to aspects of the disclosure, the images that did not successfully decode can be used to provide feedback about the reasons the decoding had failed. For example, possible reasons why an image did not decode can include one or more properties of the barcode reader system and properties of the physical code and adjacent. Optical reader properties that can cause a decode failure include insufficient illumination, non-uniform illumination, sensor-noise, high-perspective orientation relative to barcode, etc. Physical properties of the barcode and scene that can cause a decode failure include: the code marking quality or damage after marking, distortion in the applied symbol, insufficient quiet-zone, for example, features or edges too close to the Start or Stop characters. The Start and Stop characters, are delimiter characters, also called guard patterns, that occur at the beginning and end of the barcode. The Start and Stop characters can be used to allow readers to, for example, determine where to start and stop reading.

According to some aspects of the disclosure, the disclosed systems can also identify a plurality of images that contained a code and successfully decode. The systems can transmit the plurality of the images that successfully decoded to a processor for further analysis. For example, processor can analyze the code quality in the images that successfully decoded. Among, the images that successfully decoded a code, the disclosed systems can identify the images of greatest interest, e.g., those images that could provide the most information for analyzing the code quality. The tracking model can be used to identify which images correspond to the same code that was successfully decoded.

According to some embodiments, the camera and the reader image capture is synchronized, so illumination light from reading can be used for illumination of the camera image. The reader array communicates the status of the read, e.g., whether there was a good or a bad read, to the camera to provide both a good-read/bad-read status to the camera. The camera can then store, transfer, or discard the images based on the read status.

The disclosed systems can provide a real-time and/or historical overview of the performance of the system, and any aggregate collected data for a group of readers. The disclosed system can be built on a distributed architecture that can minimize the network load and distribute computation and storage for a large number of readers & data collected.

The disclosed systems can include a data collection module that can be responsible for collecting read performance data from a number of readers and can also collect no-read images. Historical data is stored, to allow a system to examine how the read performance has changed and how an intervention to a customer process (for example, replacing a printer) can affect read performance. Read performance can be measured, for example, by the decode yield (percentage). Additional criteria for read performance can include metrics that evaluate the quality or confidence of the barcode decoding.

The disclosed systems can further include an image analysis and classification module and a data synchronization module. The image analysis and classification module can perform the analysis on one or more corresponding images and generate a classification for the decode failures. Decode failures can include the lack of box during a trigger sequence, the lack of a label on a box, misplacement of a label, for example, if it is hanging off the box, and label poor print quality. The data synchronization module can be responsible for synchronizing the data between the different units of the system.

An exemplary system that collects performance data and images from one or more code reading devices is the COGNEX EXPLORER®.

According to aspects of the present invention, the disclosed systems and methods can improve the yield, for example, the successful reads, of the optical reader system. The predicted range of possible next tracked code poses are used to sequence the decode attempts on the code candidates. For example, codes that were decoded in previous images can be sequenced later or completely ignored, thereby sequencing decode candidates of other potential codes earlier. In systems such as the high-frame rate area based cameras used for optical code reading, the time available for decoding individual images is limited. In this case, improving the sequence of analyzing the code candidates (and avoiding unnecessary processing of previously decoded symbols) can improve the optical reader system yield. Similarly the predicted range of possible next tracked code poses can be used to improve the sequence of candidates of codes that were not successfully decoded. Other methods of ordering code candidates based on the predicted range of possible next tracked code poses are contemplated.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method for locating barcodes applied to objects comprising:
   receiving, by a processor, a first image of a first barcode fragment applied to a first object captured by a camera at a first time, wherein the first image does not include a second barcode fragment different from the first barcode fragment;
   identifying, by the processor, a first position of the first barcode fragment based on the first image;
   receiving, by the processor, a second image of the second barcode fragment applied to the first object captured by the camera at a second time, wherein the second image does not include the first barcode fragment;
   identifying, by the processor, a second position of the second barcode fragment based on the second image;
   predicting, by the processor, a range of possible positions of the first barcode fragment at the second time based on a tracking model that tracks the first barcode fragment based on the first position; and
   determining, by the processor, that the first barcode fragment and the second barcode fragment correspond to a same barcode applied to the first object if the second position is within the range of possible positions of the first barcode fragment at the second time.

2. The method of claim 1, wherein the tracking model tracks the first barcode fragment further based on at least one of fixed constraints, configurable constraints, adaptive constraints, and user constraints.

3. The method of claim 1, wherein the tracking model tracks the first barcode fragment further based on at least one of additional information from the first captured image and the second captured image, information derived from at least one previous image sequence, a time interval between the first time and the second time, a distance between the first position and the second position, information derived from a current image sequence, image calibration information, image scaling information, a time differential of image exposure sequence, symbology, and camera movement information.

4. The method of claim 1, wherein the tracking model tracks the first barcode fragment further based on at least one of an estimation of motion in image coordinates or an estimation of motion in a three-dimensional physical space.

5. The method of claim 1, wherein the tracking model tracks the first barcode fragment further based on at least one of a position of the camera that captured the first image and the second image, an orientation of the camera, a camera calibration, an angle of the camera with respect to the first object, and a distance of the camera from the first object.

6. The method of claim 1, further comprising combining the first barcode fragment with the second barcode fragment if the first barcode fragment and the second barcode fragment correspond to the same barcode.

7. The method of claim 1, further comprising determining that the first barcode fragment and the second barcode fragment correspond to different objects if the first barcode fragment and the second barcode fragment do not correspond to the same barcode.

8. The method of claim 1, wherein the tracking model tracks objects in an image coordinate system.

9. The method of claim 1, wherein the tracking model tracks objects moving on a conveyor belt, wherein the conveyor belt moves the objects in a first direction of travel.

10. The method of claim 9, wherein the tracking model tracks objects further based on physical properties of the conveyor belt.

11. The method of claim 10, wherein the physical properties of the conveyor belt include at least one of the first direction of travel, a transfer line speed of the conveyor belt, a length of the conveyor belt, and a width of the conveyor belt.

12. A method for locating barcodes applied to objects in a system configured to expand a field of view of a scene imaged by a camera having an image sensor, the method comprising:
   receiving a first image captured by the camera at a first time, the first image including a first field of view and a second field of view, wherein the first field of view of the first image depicts a first barcode fragment and the second field of view of the first image depicts a second barcode fragment, wherein the first image does not include a third barcode fragment and a fourth barcode fragment, wherein the first barcode fragment, the second barcode fragment, the third barcode fragment, and the fourth barcode fragment are different from each other;
   identifying, based on the first image, a first position of the first barcode fragment within the first field of view of the first image;
   identifying, based on the first image, a first position of the second barcode fragment within the second field of view of the first image;
   receiving a second image captured by the camera at a second time, the second image including a first field of view and a second field of view, wherein the first field of view of the second image depicts the third barcode fragment and the second field of view of the second image depicts the fourth barcode fragment, wherein the second image does not include the first barcode fragment and the second barcode fragment;
identifying, based on the second image, a second position of the third barcode fragment within the first field of view of the second image;
identifying, based on the second image, a second position of the fourth barcode fragment within the second field of view of the second image;
predicting a range of possible positions of the first barcode fragment at the second time based on a first tracking model that tracks the first barcode fragment based on the first position of the first barcode fragment;
predicting a range of possible positions of the second barcode fragment at the second time based on a second tracking model that tracks the second barcode fragment based on the first position of the second barcode fragment;
determining whether the second position of the third barcode fragment is within the range of possible positions of the first barcode fragment at the second time;
determining whether the second position of the fourth barcode fragment is within the range of possible positions of the second barcode fragment at the second time; and
determining that the first barcode fragment, the second barcode fragment, the third barcode fragment, and the fourth barcode fragment correspond to a same barcode if the second position of the third barcode fragment is within the range of possible positions of the first barcode fragment and the second position of the fourth barcode fragment is within the range of possible positions of the second barcode fragment at the second time.

13. The method of claim 12, wherein the first tracking model and the second tracking model track barcode fragments further based on at least one of fixed constraints, configurable constraints, adaptive constraints, and user constraints.

14. The method of claim 12, wherein the first tracking model and the second tracking model track barcode fragments further based on at least one of additional information from the first captured image and the second captured image, information derived from at least one previous image sequence, a time interval between the first time and the second time, a distance between the first position of the first barcode fragment and the second position of the first barcode fragment, a distance between the first position of the second barcode fragment and the second position of the second barcode fragment, information derived from a current image sequence, image calibration information, image scaling information, a time differential of image exposure sequence, symbology, and camera movement information.

15. The method of claim 12, wherein the first tracking model and the second tracking model track barcode fragments further based on at least one of an estimation of motion in image coordinates or an estimation of motion in a three-dimensional physical space.

16. The method of claim 12, wherein the first tracking model and the second tracking model track barcode fragments further based on at least one of a position of the camera that captured the first image and the second image, an orientation of the camera, a camera calibration, an angle of the camera with respect to the first object, and a distance of the camera from the first object.

17. The method of claim 12, further comprising combining the first barcode fragment, the second barcode fragment, the third barcode fragment, and the fourth barcode fragment if the barcode fragments correspond to the same barcode.

18. The method of claim 12, further comprising determining that the barcode fragments correspond to different objects if the barcode fragments do not correspond to the same barcode.

19. The method of claim 12, wherein the tracking model tracks objects in an image coordinate system.

20. The method of claim 12, wherein the tracking model tracks objects moving on a conveyor belt, wherein the conveyor belt moves the objects in a first direction of travel.

21. The method of claim 20, wherein the tracking model tracks objects further based on physical properties of the conveyor belt.

22. The method of claim 21, wherein the physical properties of the conveyor belt include at least one of the first direction of travel, a transfer line speed of the conveyor belt, a length of the conveyor belt, and a width of the conveyor belt.

23. A system for locating barcodes applied to objects comprising:
a camera configured to capture images of barcodes applied to objects; and a processor in communication with the camera configured to:
receive a first image of a first barcode fragment applied to a first object captured by the camera at a first time, wherein the first image does not include a second barcode fragment different from the first barcode fragment;
identify a first position of the first barcode fragment based on the first image;
receive a second image of the second barcode fragment applied to the first object captured by the camera at a second time, wherein the second image does not include the first barcode fragment;
identify a second position of the second barcode fragment based on the second image;
predict a range of possible positions of the first barcode fragment at the second time based on a tracking model that tracks the first barcode fragment based on the first position; and
determine that the first barcode fragment and the second barcode fragment correspond to a same barcode applied to the first object if the second position is within the range of possible positions of the first barcode fragment at the second time.

24. A system for locating barcodes applied to objects, the system configured to expand a field of view of a scene imaged by a camera having an image sensor, the system comprising:
the camera configured to capture images of barcodes applied to objects; and a processor in communication with the camera configured to:
receive a first image captured by the camera at a first time, the first image including a first field of view and a second field of view, wherein the first field of view of the first image depicts a first barcode fragment and the second field of view of the first image depicts a second barcode fragment, wherein the first image does not include a third barcode fragment and a fourth barcode fragment, wherein the first barcode fragment, the second barcode fragment, the third barcode fragment, and the fourth barcode fragment are different from each other;
identify, based on the first image, a first position of the first barcode fragment within the first field of view of the first image;

identify, based on the first image, a first position of the second barcode fragment within the second field of view of the first image;

receive a second image captured by the camera at a second time, the second image including a first field of view and a second field of view, wherein the first field of view of the second image depicts the third barcode fragment and the second field of view of the second image depicts the fourth barcode fragment, wherein the second image does not include the first barcode fragment and the second barcode fragment;

identify, based on the second image, a second position of the third barcode fragment within the first field of view of the second image;

identify, based on the second image, a second position of the fourth barcode fragment within the second field of view of the second image;

predict a range of possible positions of the first barcode fragment at the second time based on a first tracking model that tracks the first barcode fragment based on the first position of the first barcode fragment;

predict a range of possible positions of the second barcode fragment at the second time based on a second tracking model that tracks the second barcode fragment based on the first position of the second barcode fragment;

determine whether the second position of the third barcode fragment is within the range of possible positions of the first barcode fragment at the second time;

determine whether the second position of the fourth barcode fragment is within the range of possible positions of the second barcode fragment at the second time; and determine that the first barcode fragment, the second barcode fragment, the third barcode fragment, and the fourth barcode fragment correspond to a same barcode if the second position of the third barcode fragment is within the range of possible positions of the first barcode fragment and the second position of the fourth barcode fragment is within the range of possible positions of the second barcode fragment at the second time.

* * * * *